No. 664,206. Patented Dec. 18, 1900.
I. ALLEGRETTI.
CONFECTIONER'S PAN.
(Application filed Oct. 18, 1897.)
(No Model.)
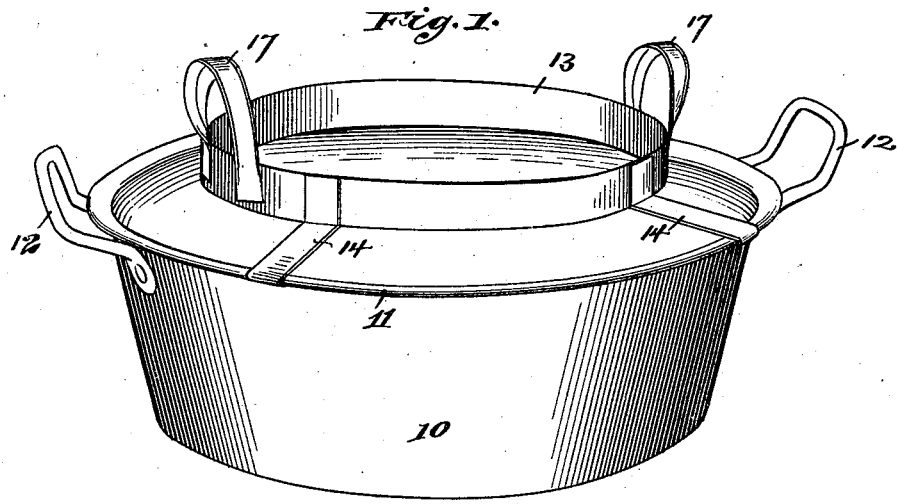
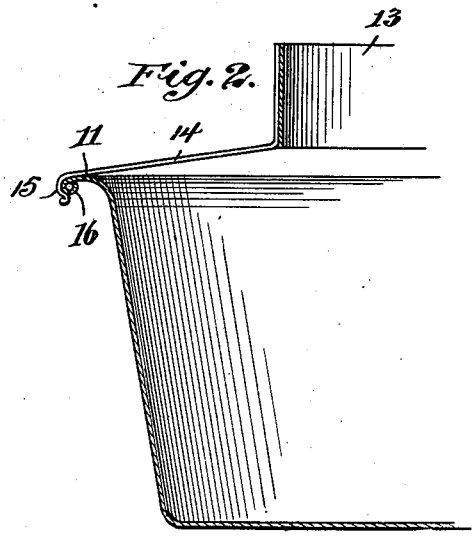
Witnesses,
Inventor:
Ignazio Allegretti,
By Offield, Towle & Linthicum,
Attys.

UNITED STATES PATENT OFFICE.

IGNAZIO ALLEGRETTI, OF CHICAGO, ILLINOIS.

CONFECTIONER'S PAN.

SPECIFICATION forming part of Letters Patent No. 664,206, dated December 18, 1900.

Application filed October 18, 1897. Serial No. 655,505. (No model.)

*To all whom it may concern:*

Be it known that I, IGNAZIO ALLEGRETTI, of Chicago, in the county of Cook and State of Illinois, have invented certain new and useful Improvements in Confectioners' Pans, of which the following is a specification.

This invention relates to pans for the use of confectioners, and has for its object to provide a structure of this nature whereby waste of material may be prevented and superior cleanliness obtained.

The device is particularly devised for use in the manufacture of chocolate-creams and similar confections, in which, as a part of the process of manufacture, a nucleus or central body is coated by dipping it in a solution or paste of the chocolate or the like. In performing this operation the chocolate or other coating adheres to the fingers and hands of the operator, and in order to remove the same it is customary to scrape or wipe the hands upon the edge of the pan or receptacle containing the coating. When this is done, not only does the edge of the pan as well as the handles thereof become covered with the coating, but a large portion thereof falls on the outside of the pan and is thus wasted, thereby causing considerable loss. It is the object of my present invention to avoid this uncleanliness and waste of material; and to these ends my invention consists in the combination of a confectioner's pan for containing a paste or solution and a ring or annulus of less diameter than the mouth of the pan and supported above the pan removably in such a position that the hands of the confectioner may be readily scraped or cleansed thereon, the surplus material thus removed from the hands falling back into the body of the pan, and thus being saved and not wasted, while at the same time the pan proper and its handles are kept clean and do not become caked or covered with the coating material.

In the accompanying drawings, Figure 1 is a perspective view of a confectioner's pan embodying my invention in one form, and Fig. 2 is an enlarged detail sectional view illustrating a modified construction.

In the said drawings, 10 represents the pan proper, which is of the usual construction, having the flanged upper edge 11 and handles 12.

13 represents a ring or annulus constructed, preferably, of sheet metal of comparatively small vertical height, said ring or annulus being of less diameter than the mouth of the pan 10 and being supported in position within or above said mouth by means of arms 14, secured to said ring and connected to the edge of the pan. The connection between said arms and the edge of the pan may be such, for instance, as indicated in Fig. 2, wherein the arms 14, which are of sheet metal, and consequently possessed of some elasticity or spring, are bent at their outer ends to form catches 15, which engage with the bead 16 on the end of the flange 11, which forms the upper edge of the pan. The ring or annulus 13 may be provided with handles 17, if desired.

It will be seen that by the use of the construction devised the confectioner may scrape the surplus material from his hands or fingers upon the annulus 13 and that said material will fall back into the body of the pan, and will thus be prevented from being wasted, while at the same time the edge of the pan proper and the handles thereof will be protected and kept clean. When the ring or annulus is detachable, it may be readily removed from the pan, and may therefore be readily cleaned independently of the pan whenever necessary or desirable.

It is obvious that the particular conformation and details of construction of the device may be varied without departing from the principle of my invention. I therefore do not wish to be understood as limiting myself to the precise details of construction hereinbefore described and shown in the drawings.

I claim—

The combination with a confectioner's pan having an open top and a beaded rim, of a ring of less diameter than the top of the pan to be used as a scraper for the hands, provided with a plurality of arms formed of spring metal permanently secured to said ring in position to extend radially therefrom to the adjacent rim of the pan, each arm terminating in a spring-catch adapted to engage the rim of the pan, whereby the ring is detachably but securely supported within and above the mouth of the pan, substantially as described.

IGNAZIO ALLEGRETTI.

Witnesses:
L. F. McCREA,
IRVINE MILLER.